United States Patent [19]

Nelson

[11] 3,851,614

[45] *Dec. 3, 1974

[54] BALANCED STEERABLE POWER TRANSMISSION

[76] Inventor: Donald F. Nelson, 7560 Kentwood Ct., Gilroy, Calif. 95020

[*] Notice: The portion of the term of this patent subsequent to Aug. 7, 1990, has been disclaimed.

[22] Filed: Oct. 5, 1972

[21] Appl. No.: 295,279

Related U.S. Application Data

[63] Continuation-in-part of Ser. No. 241,361, April 5, 1972, Pat. No. 3,750,616.

[52] U.S. Cl. .............. 115/35, 74/665 K, 74/665 M, 74/754
[51] Int. Cl............................................. B63h 25/42
[58] Field of Search ............ 115/35, 34 R, 34 B, 37, 115/41 R, 41 HT; 74/665 P, 756, 705, 674, 665 K, 665 M, 665 L, 682, 754

[56] References Cited
UNITED STATES PATENTS

| | | | |
|---|---|---|---|
| 3,094,967 | 12/1961 | Willis | 115/35 |
| 3,511,209 | 5/1970 | Becker | 115/35 |
| 3,554,155 | 1/1971 | Eichinger | 115/35 |
| 3,750,616 | 8/1975 | Nelson | 115/35 |

FOREIGN PATENTS OR APPLICATIONS

| | | | |
|---|---|---|---|
| 1,054,916 | 1/1967 | England | 115/34 R |

*Primary Examiner*—Robert J. Spar
*Assistant Examiner*—Gary L. Auton
*Attorney, Agent, or Firm*—Christie, Parker & Hale

[57] ABSTRACT

A transmission having an output shaft normal to its input shaft is described. A pair of balanced drive trains extends between the input shaft and output shaft so that no torque is transmittted from the output shaft to the supporting housing. The housing is mounted to pivoting about the drive shaft axis so that the output shaft can be pointed in any direction normal to the input shaft. Each of the balanced drive trains comprises a drive ring gear with the two ring gears driven in mutually opposite sense. Each drive ring gear engages a planetary ring gear having planetary pinions mounted therein. The pinions in turn engage a transfer gear concentric with the planetary ring gear and the input transfer gear is connected to an output transfer gear that engages an output gear on the output shaft. The pinions are mounted on a spider coaxial with the planetary ring gear. The two spiders from the two drive trains are in engagement so as to be constrained move in mutually opposite sensed of rotation. Precession of the spiders supporting the planetary pinions permits transmission pivoting while maintaining a positive drive to the output shaft.

15 Claims, 3 Drawing Figures

BALANCED STEERABLE POWER TRANSMISSION

This application is a continuation-in-part of my copending patent application Ser. No. 241,361, filed Apr. 5, 1972, and entitled POWER TRANSMISSION SYSTEM now U.S. Pat. No. 3,750,616.

BACKGROUND OF THE INVENTION

In the field of small boats, outboard motors have been used on the boat transom. Inboard motors have been used with a fixed propeller shaft and inboard-outboard arrangements have been used with an inboard motor and a steerable drive arrangement supporting the propeller. Outboard motors have limited power and are found undesirable by many people because of their relatively unattractive appearance on an otherwise handsome boat. Outboard motors are often advantageous since the entire motor and propeller combination can be skewed so that the propeller is driving in a direction off of the axis of the boat. This provides very responsive steering and enables outboard motor boats to turn in very short distances.

Inboard motor boats have considerably more power available because of the size of marine engines that can be mounted within the hull at a more advantageous position relative to the center of buoyancy. The typical inboard motor boat has a propeller on a shaft that is aligned with the axis of the boat. A rudder is usually located immediately aft of the propeller for optimum steering with minimized rudder area. Although such inboard arrangements have considerably more power than outboards, steering of the boat is not nearly as responsive.

Inboard-outboard arrangements have been used in an effort to combine the best of both systems. In these an inboard motor of relatively high power is advantageously located relative to the center of buoyancy of the boat. The output from this marine engine is coupled to a steerable drive arrangement extending out of the transom of the boat so that the structure mounting the propeller can be skewed relative to the boat axis and very responsive steering obtained. The inboard-outboard arrangements are subject to difficulties since the high power levels in the steerable mechanisms require great mechanical complexity and a corresponding degradation in reliability. The complexity of the drive and steering arrangement also makes the inboard-outboard arrangement relative expensive.

As mentioned in my aforementioned copending application it has been recognized that it is desirable to provide an inboard power system for boats wherein the driving propeller can be readily steered to acquire the responsive steering of an outboard motor system. Such a system for driving the propeller should be balanced so that no more torque is required for steering in one direction than in the other. It is also desirable that the steering arrangement have the ability to be rotated a full 360° to avoid reverse shifting mechanisms, if possible.

In the aforementioned copending application I have provided such a drive arrangement for a small boat wherein a steerable power transmission system has an output shaft normal to an input shaft and it is possible to pivot the entire output shaft to point in any direction normal to the input shaft. Thus, for example, by pointing the transmission toward the bow of the boat, it can drive aft with as much driving efficiency in the propeller as when the boat is being driven in the forward direction. In the arrangement provided in my copending application, oppositely directed over-running clutches in balanced drive trains permit the housing supporting the output shaft to be pivoted about the axis of the drive shaft for steering. Contra-rotating ring gears drive the two drive trains. Preferably, over-running clutches are avoided so that if desired the transmission can be driven in reverse. It is, therefore, desirable to provide a steerable power transmission with balanced output torque and without over-running clutches.

BRIEF SUMMARY OF THE INVENTION

Therefore, in practice of this invention according to a presently preferred embodiment, a pair of drive ring gears are driven in mutually opposite sense of rotation by an input drive member. An output shaft with an output gear thereon is coupled to the two drive ring gears, by a pair of similar drive trains. Each of the drive trains has a planetary ring gear driven by the respective drive ring gear. Each planetary ring gear has a plurality of pinion gears therein and also in engagement with an input transfer gear. An output transfer gear connected to the input transfer gear engages the output gear and these two output transfer gears from the two drive trains are in engagement with opposite portions of the output gear and rotate in the same sense for applying balanced torque to the output shaft. Each drive train also includes a spider interconnecting the respective pinion gears for maintaining a constant angular interrelation. The two spiders from the two drive trains are coupled together for limiting rotation thereof to opposite senses. This permits the direction of the output shaft to be pivoted 360° around the input drive member while still maintaining a positive drive.

DRAWINGS

These and other features and advantages of the present invention will be appreciated as the same becomes better understood by reference to the following detailed description of a presently preferred embodiment when considered in connection with the accompanying drawings wherein.

DESCRIPTION

Figure 1:
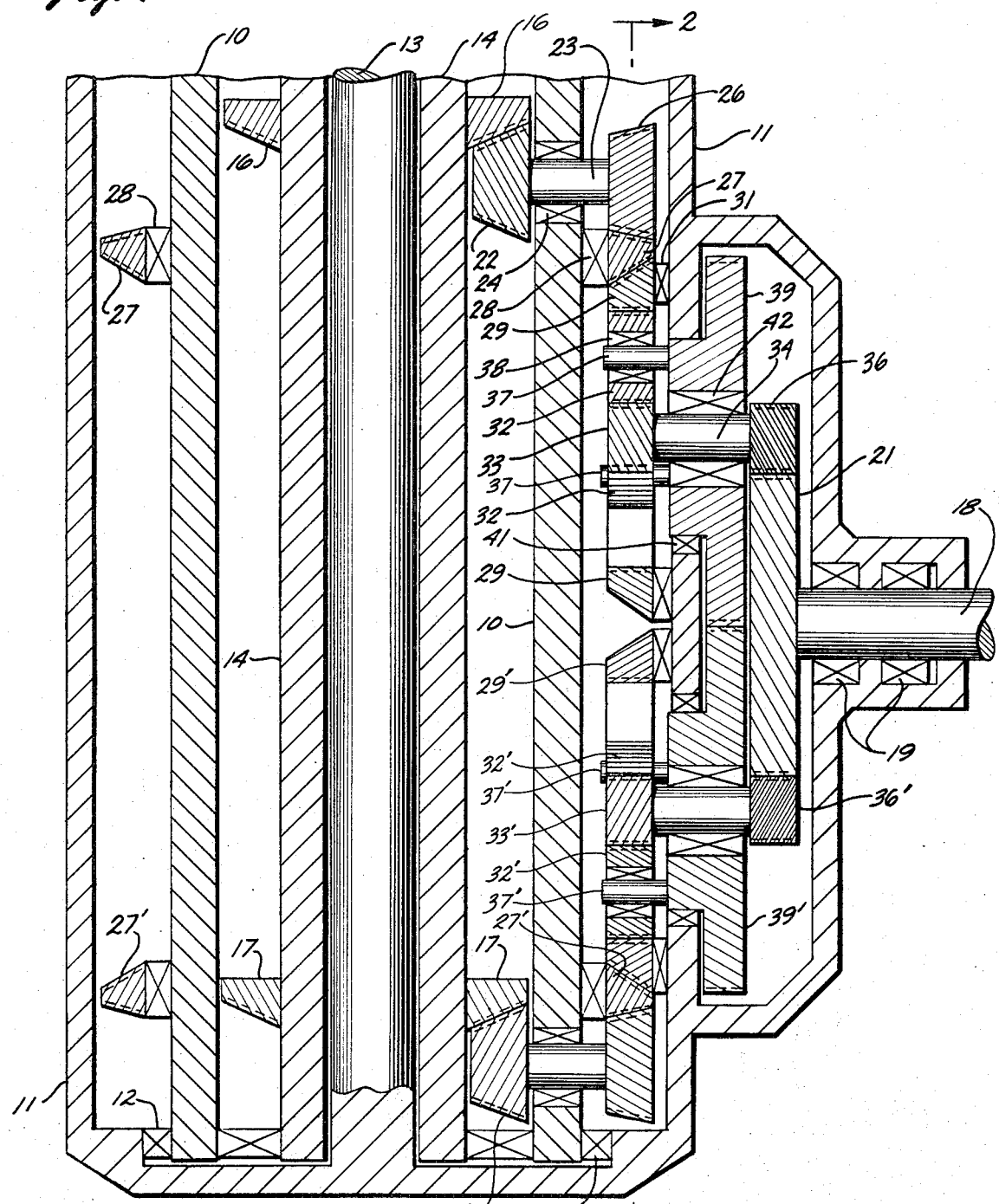
FIG. 1 illustrates in semi-schematic longitudinal cross-section a balanced steerable power transmission system constructed according to principles of this invention.
Figure 2:
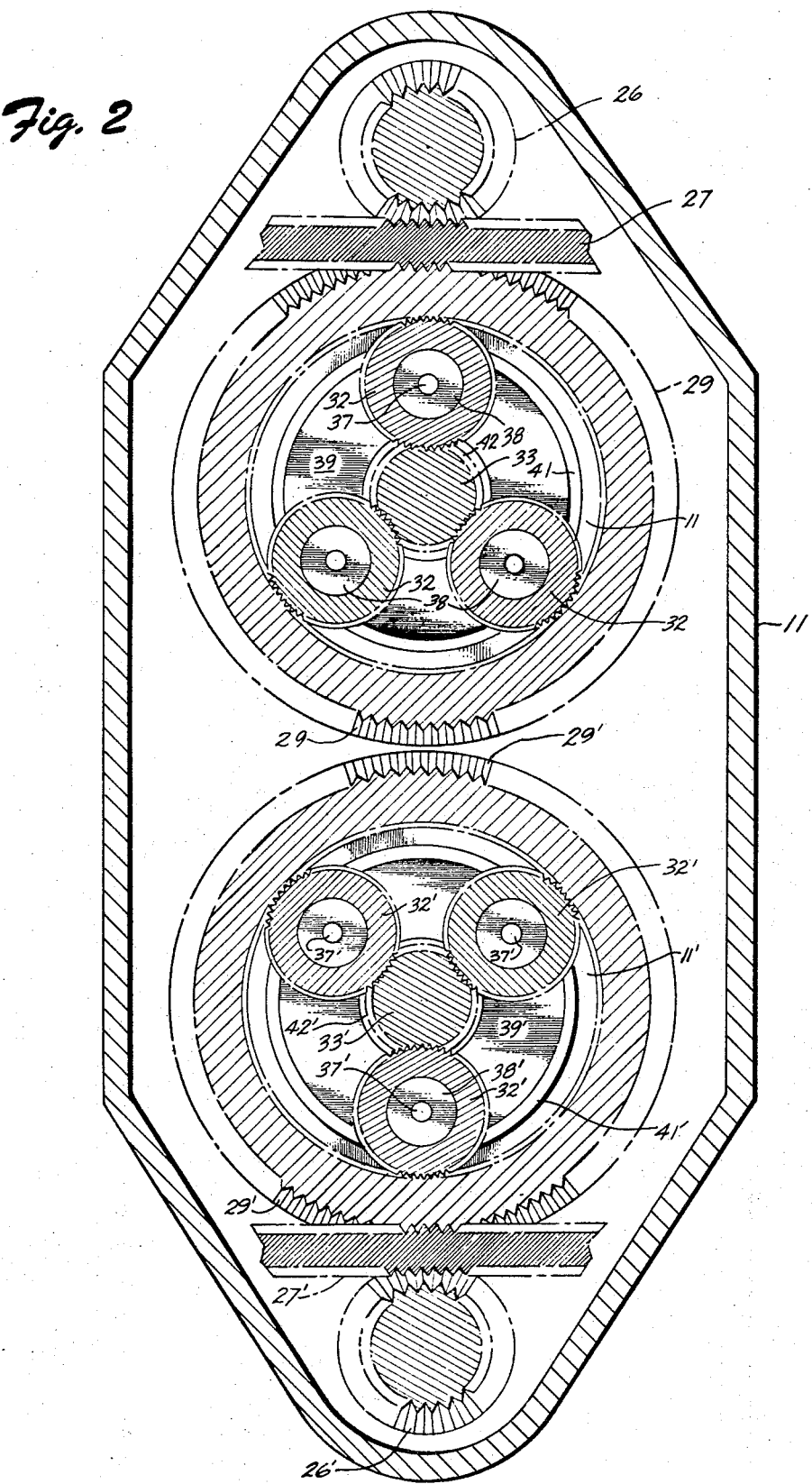
FIG. 2 is a longitudinal cross-section taken along line 2—2 of FIG. 1.

FIGS. 1 and 2 illustrate in a pair of longitudinal cross-sections a balanced steerable power transmission constructed according to principles of this invention. A transmission of this type may be employed for driving and steering a small boat, for example. Such an arrangement and means for applying power from an inboard motor and steering forces are described in detail in the aforementioned copending patent application which is hereby incorporated by reference. As described in my copending application a fixed housing 10 having a generally tubular form is attached to a bottom portion of a boat. A rotatable or steerable housing 11 is connected to the fixed housing at its upper end (not shown) so that it can be pivoted around the fixed housing for steering the transmission. The steerable housing is preferably also connected to the fixed housing by a bearing 12 at the lower end for adequate lateral support.

The bearing 12 and other bearings present in the transmission are indicated only schematically in the drawings. It will also be apparent that the various gears, housings and the like are illustrated only schematically herein to show the interrelation therebetween and many variations in specific dimensions suitable for selected power levels and speeds will be apparent to one skilled in the art.

A steering shaft 13 is connected to the steerable housing 11 at its lower end. The upper end of the steering shaft may be connected to a tiller 52 (FIG. 3) or other conventional arrangements for steering. A drive tube 14 is concentric with the steering shaft 13 and serves as the main power input of the steerable transmission. The upper end of the drive tube 14 (not shown) may be driven from a conventional inboard marine engine, for example, and would typically be rotated at fairly high speed. An upper bevel driving gear 16 and a lower bevel driving gear 17 are mounted on the drive tube for rotation therewith.

An output shaft 18 is mounted in bearings 19 for rotation in the steerable housing about an axis transverse to the pivot axis of the steerable housing. Typically in a marine application, the propeller 51 (FIG. 3) is mounted on the output shaft 18. An output gear 21 is mounted on the output shaft 18 for driving it.

In between the drive tube 14 and the output gear 21 there are a pair of similar drive trains having their input portion coupled to the driving beveled gears 16 and 17 respectively and their output portions coupled to the output gear. It is because of these similar drive trains and the inter-relation therebetween that the driving force on the output gear 21 is balanced so that there is no tendency for the driving torques applied to the drive tube and through the output shaft to pivot the rotatable housing 11 about its axis. Similarly because of the balancing of the two interrelated drive trains, equal forces are required for pivoting the steerable housing in either direction for steering the transmission.

Each of the drive trains is similar, only the upper one will be described in detail herein. For ease in making a correlation, the corresponding elements of the lower drive train are indicated by the same reference numerals with a prime affixed thereto. The input portion to the upper drive train comprises a driven bevel gear 22 in engagement with the upper driving bevel gear 16 so as to be driven thereby. The driven bevel gear 22 is mounted on a shaft 23 which is fixed in location but permitted to rotate relative to the fixed housing by a bearing 24. A transfer bevel gear 26 is mounted on the opposite end of the shaft 23, for rotation therewith.

The transfer bevel gear 26 is in engagement with a drive ring gear 27. The drive ring gear 27 is mounted on the fixed housing 10 by a bearing 28 for rotation around the same axis as the drive tube 14. The opposite face of the drive ring gear 27 from the transfer bevel gear 26 is in driving engagement with a planetary ring gear 29. A bearing 31 mounts the planetary ring gear 29 on the steerable housing 11 so that it is free to rotate about an axis transverse to the axis of rotation of the drive ring 27.

Although in the illustrations of this application the planetary ring gear 27 appears in the same plane as the transfer bevel gear 26, it should be apparent that the relative position of the planetary gear and transfer gear can be at any arbitrary location around the drive ring gear 27. This is the case since the location of the transfer bevel gear is fixed by the fixed housing, whereas the location of the planetary ring gear 29 is a function of the pivotal position of the steerable housing 11 at any selected time.

Three planetary pinion gears 32 are mounted in the planetary ring gear 29 so as to be in engagement with its inner gear face. Each of the planetary pinion gears is also in engagement with an input transfer spur gear 33 concentric with the planetary ring gear. The input transfer spur gear 33 is mounted on a transfer shaft 34 and an output transfer spur gear 36 is mounted on the opposite end of the transfer shaft. The output transfer spur gear 36 is in engagement with the output gear 21 on the output shaft 18.

The driving force transferred between the drive tube 14 and the output shaft 18, is thus applied successively through the upper driving bevel gear 16 to the driven bevel gear 22; through the transfer bevel gear 26 which is connected to the driven bevel gear 22 to the drive ring gear 27; The drive ring gear in turn drives the planetary ring gear 29; the planetary pinions 32 transfer the force to the input transfer gear 33; and the output transfer gear 36 in turn transmits the force to the output gear 21 connected to the output shaft 18.

Each of the planetary pinion gears 32 is mounted on a finger 37 by a bearing 38. The three fingers which space the planetary pinions 32 apart are fixed on a balancing spur gear or spider 39. The balancing spider 39 is mounted on a bearing 41 so that it is free to rotate coaxially the planetary ring gear 29. The transfer shaft 34 is mounted in a bearing 42 in the balancing spider for concentric rotation therewith. The fingers 37 position the planetary pinions 32 radially and circumferentially within the planetary ring gear 29.

As mentioned above the drive train between the lower driving bevel gear 17 and the output transfer spur gear 36' in engagement with the output gear 21 is similar to the upper drive train just described. The driving force applied by the output transfer gears 36 and 36' to the output gear 21 is therefore balanced and there is no net tendency of the torques to cause the steerable housing 11 to rotate about its axis. The drive trains remain balanced since the respective drive ring gears 27 and 27' are both driven by the same drive tube but in mutually opposite senses of rotation. That is, as one of the drive ring gears rotates clockwise the other drive ring gear rotates counterclockwise. Since the two drive ring gears are rotating in opposite sense there is no net force from the input end tending to rotate the steerable housing about its axis. Thus the input and output of the steerable transmission are balanced in the coupling between the fixed transfer bevel gear 26 and the movable output transfer spur gear 36.

The planetary pinion gears 32 would simply precess rapidly within the planetary ring gear 29 if they were not constrained by the balancing spur gear or spider 39. The balancing spur gears 39 and 39' from the two drive trains are in engagement so that they too are constrained to rotate only in opposite sense. It will be noted that the planetary ring gears 29 and 29' are rotatable in the same sense so that the tendency of the planetary pinion gears 32 and 32' to precess is in the same sense in both drive trains. This tendency is resisted by the respective balancing gears 39 and 39' which are in engagement so that the tendencies to precess are substantially exactly balanced. Typically when the steerable housing 11 is maintained in a fixed position, while the transmission is running, the balancing gears 39 and 39' remain stationary due to their opposing interengagement.

When it is desired to pivot the steerable housing about its axis for steering the transmission, the coupling between the input and output of one of the drive trains must accommodate a differential motion and prevent locking up of the transmission. In the embodiment described and illustrated in the aforementioned copending application an over-running clutch was provided in each drive train so that the output portion of the respective drive train can advance in rotation relative to the input portion when the outer steerable housing is pivoted. The slippage in one of the over-running clutches permits the needed advancement of the output portion of the drive train.

In the embodiment herein described and illustrated the advancement is provided by precession of the planetary pinion gears 32 within the planetary ring gear 29. The extent of precession is limited by the balancing spur gears 39 and 39' which are in engagement with each other. Since there is inherently a tendency for the planetary gears in one or the other of the drive trains to precess in the proper direction as the steerable housing is pivoted, it takes very little input torque on the steering mechanism to rotate the steerable housing. One need only overcome bearing friction and this is quite normal.

Figure 3:
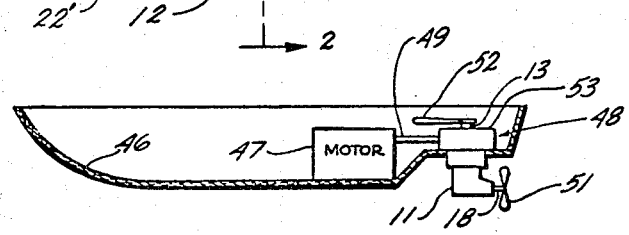
FIG. 3 illustrates semi-schematically a boat having a balanced steerable power transmission.

FIG. 3 illustrates in longitudinal cross section a small boat 46 constructed so as to be driven by a balanced steerable power transmission system as hereinabove described. The hull of the boat is shown only generally and the entire view is a semi-schematic arrangement of structures readily implemented by one skilled in the art.

A suitable marine engine 47 such as a gasoline or diesel motor is mounted at some convenient location within the hull for aligning the center of gravity and center of buoyancy. The power transmission 48 is mounted in an aft portion of the boat and a drive shaft 49 couples it to the motor 47. The steerable housing 11 extends beneath the hull of the boat. The propeller 51 is mounted on the output shaft 18. A tiller 52 is connected to the steering shaft 13 for rotating the steerable housing 11 and thereby steering the boat. The upper gear case 53 is substantially the same as that described and illustrated in my copending parent application.

Clearly many modifications and variations can be made in the specific design described and illustrated herein. One of the more apparent modifications, for example, is in the location and driving arrangement for the drive ring gears 27 and 27'. In the illustrated arrangement these gears are widely spaced apart with the planetary ring gears 29 and 29' arranged therebetween. If desired, the two drive ring gears can be placed between the two planaetary ring gears and in similar driving engagement therewith. This modification permits one to use a single driven bevel gear, shaft, and transfer bevel gear for driving both drive ring gears in mutually opposite sense of rotation. With such an arrangement, it may be desirable to make the balancing spur gears 39 and 39' somewhat smaller so that they are no longer in direct engagement and add a short gear train therebetween for assuring that the two balancing spiders are constrained to rotate in the opposite sense of rotation. A crossed V-belt is also suitable for connecting the balancing spiders since only occasional and low speed rotation of the balancing spiders occurs during use of the transmission. The choice between the arrangement just mentioned and the embodiment described and illustrated in greater detail is dictated to a substantial extent by the desired external configuration of the transmission which must be sufficiently wide to accommodate the diameter of the drive ring gears 27 and 27'.

It will be noted that the balanced steerable power transmission hereinabove described and illustrated is reversible, that is, the sense of rotation of the drive tube can be in either direction and positive driving force is invariably applied to the output shaft by the two drive trains. The same is not true of the balanced steerable power transmission described and illustrated in the aforementioned copending application because of the overrunning clutches which merely slip if driven in reverse. It will also be noted that whereas in the embodiment described and illustrated herein the description has considered an input drive member 14 and an output shaft 18, the roles of these structural elements can be reversed so that power can be applied to the "output" shaft 18 for transfer to the "input" member 14.

Many other modifications and variations will be apparent to one skilled in the art. It is therefore to be understood that within the scope of the appended claims the invention may be practiced otherwise than as specifically described.

I claim:

1. A balanced steerable power transmission comprising:

a fixed housing;

a rotatable drive member within the fixed housing;

a steerable housing around a portion of the fixed housing and mounted for pivoting about an axis extending along the fixed housing;

an output shaft fixed in location on the steerable housing and rotatable relative thereto;

a pair of similar drive trains between the drive member and the output shaft, each drive train having:

an input portion coupled to the drive member and fixed in location by the fixed housing, an output portion in equal driving engagement with the output shaft irrespective of the pivotal location of the output shaft around the pivot axis of the steerable housing, including a ring gear between the fixed housing and the steerable housing, and means for mounting each respective ring gear for rotation about the pivot axis of the steerable housing, said ring gears of the respective drive trains being coupled to the drive member for rotation in mutually opposite sense, and coupling means between the drive member and the output shaft for advancement of rotation of the output portion of the drive train relative to rotation of the respective input portion.

2. A balanced steerable power transmission as defined in claim 1 wherein the coupling means in each drive train comprises:

a planetary ring gear having an outer gear face in engagement with the respective ring gear;

a balancing spider coaxial with the planetary ring gear;

a transfer shaft coaxial with the balancing spider and free to rotate relative thereto;

a plurality of planetary pinions in driven engagement with a gear face inside the planetary ring gear and in driving engagement with the transfer shaft, each of said planetary pinions being mounted on the balancing spider for rotation about an axis parallel to the balancing spider axis, the plurality of the planetary pinions being circumferentially spaced apart on the balancing spider; and a drive gear on each drive shaft in engagement with the output drive gear; and wherein the balancing spiders of the respective drive trains are in driving engagement for rotation in mutually opposite sense.

3. A balanced steerable power transmission comprising:

a fixed housing;

a steerable housing surrounding a portion of the fixed housing;

means for pivoting the steerable housing about an axis extending along the fixed housing;

a drive member coaxial with the steerable housing;

means for mounting the drive member for rotation relative to the fixed housing and the steerable housing;

a first ring gear coaxial with the drive member;

a second ring gear coaxial with the drive member;

means for mounting the first ring gear and second ring gear respectively for rotation relative to the fixed housing and the outer housing;

means for connecting the drive member to the first and second ring gears respectively for driving them in mutually opposite directions of rotation;

an output shaft extending through the steerable housing;

a driven gear connected to the output shaft and having an axis transverse to the drive member axis; and means interconnecting the output shaft with both the first and second ring gears for rotation of the output shaft in response thereto without substantial torque on the steerable housing irrespective of pivotal position of the output shaft relative to the fixed housing.

4. A balanced steerable power transmission as defined in claim 3 further comprising:

a pair of planetary ring gears, each having an outer gear face in engagement with one of the first or second ring gears;

a balancing spider coaxial with each of the planetary ring gears, said balancing spiders being in driving engagement with each other for rotation in mutually opposite sense;

a transfer shaft coaxial with each of the balancing spiders and free to rotate relative thereto;

a plurality of planetary gears mounted on each of the balancing spiders, said planetary gears each being spaced radially apart from the center of the respective balancing spider and free to rotate about an axis parallel to the balancing spider axis, said planetary gears being in driven engagement with a gear face inside the respective planetary ring gear and in driving engagement with the respective transfer shaft; and an output transfer gear on each transfer shaft in engagement with the output driven gear.

5. A balanced steerable power transmission comprising:

an output shaft;

an output gear fixed on the output shaft;

a first planetary ring gear;

a second planetary ring gear;

balanced means for driving the first and second planetary ring gears in the same sense of rotation and;

a drive train between each planetary ring gear and the output gear, each of said drive trains comprising;

a plurality of planetary pinion gears in engagement with the respective planetary ring gear;

a spider interconnecting the respective plurality of pinion gears for maintaining constant angular interrelation therebetween;

an input transfer gear in engagement with the respective plurality of pinion gears;

an output transfer gear connected to the input transfer gear and in engagement with the output gear, the output transfer gears of the two drive trains being in engagement with opposite portions of the output gear and rotatable in the same sense; and means for interconnecting the spiders of the respective drive trains for limiting rotation of one of the spiders to an opposite sense from the other.

6. A balanced steerable power transmission comprising:

an output shaft;

an output gear fixed on the output shaft;

a first planetary ring gear;

a second planetary ring gear;

balanced means for driving the first and second planetary ring gears in the same sense of rotation comprising:

a first drive ring gear in engagement with the first planetary ring gear, a second drive ring gear in engagement with the second planetary ring gear, and means for driving the first and second drive ring gears at the same angular velocity and in opposite sense; and a drive train between each planetary ring gear and the output gear, each of said drive trains comprising:

a plurality of planetary pinion gears in engagement with the respective planetary ring gear, a spider interconnecting the respective plurality of pinion gears for maintaining constant angular interrelation therebetween, an input transfer gear in engagement with the respective plurality of pinion gears, an output transfer gear connected to the input transfer gear and in engagement with the output gear, the output transfer gears of the two drive trains being in engagement with opposite portions of the output gear and rotatable in the same sense, and means for interconnecting the spiders of the respective drive trains for limiting rotation thereof to mutually opposite sense.

7. A balanced steerable power transmission as defined in claim 6 wherein the means for interconnecting the two spiders comprises a gear face around each spider and wherein said gear faces are in interengagement.

8. A balanced steerable power transmission comprising:
an outer housing pivotable about a longitudinal axis;
a drive shaft rotatable about the longitudinal axis;
an output shaft pivotable with the outer housing and rotatable about an axis normal to the longitudinal axis;
an output gear fixed on the output shaft;
a pair of similar drive trains between the drive shaft and the output gear, each of the drive trains comprising:
a planetary ring gear;
a plurality of planetary pinion gears in engagement with the respective planetary ring gear;
an input transfer gear concentric with the respective planetary ring gear and in engagement with the respective plurality of pinion gears;
an output transfer gear connected to the input transfer gear and in engagement with the output gear;
a spider interconnecting the respective plurality of pinion gears for maintaining constant angular interrelation therebetween;
means for interconnecting the two spiders for limiting rotation thereof to the same sense;
a first drive ring gear in engagement with the first planetary ring gear;
a second drive ring gear in engagement with the second planetary ring gear; and
means for connecting the first and second drive ring gears in rotational engagement with the drive shaft for driving them in mutually opposite sense of rotation; and wherein
the axes of rotation of the planetary ring gears, pinion gears, input transfer gears, output transfer gears, and spiders are parallel to the axis of rotation of the output shaft.

9. A balanced steerable power transmission as defined in claim 8 further comprising a fixed housing; and wherein the means for driving each drive ring gear comprises:
a bevel gear mounted on the drive shaft;
a first input bevel gear in engagement with the bevel gear;
a second bevel transfer gear connected to the input bevel gear; and
a bevel gear face on the drive ring gear in engagement with the transfer gear.

10. A boat comprising:
a hull;
a motor mounted in the hull;
a steerable power transmission connected to the motor and including a pivotable portion extending below the hull;
a drive propeller on the pivotable portion of the transmission;
an output gear connected to the propeller;
a pair of transfer gears engaging the output gear on opposite sides thereof;
a pair of drive ring gears within the pivotable portion;
means for mounting the drive ring gears for rotation about an axis transverse to the rotation axis of the output gear;
common means for rotating the drive ring gears in mutually opposite sense in response to operation of the motor;
means between each drive ring gear and one respective transfer gear for driving the transfer gears in the same sense of rotation including a planetary drive;
means for coupling the planetary drive for accommodating differential motion of one planetary drive relative to the other planetary drive for permitting either of the transfer gears to rotate relatively faster than the other transfer gear; and
means for pivoting the pivotable portion and the axis of the propeller about the axis of the drive ring gear.

11. A boat as defined in claim 10 wherein the planetary drive comprises:
a planetary ring gear in engagement with the respective drive ring gear;
a plurality of planetary pinions within the planetary ring gear and in driven engagement therewith; and an input transfer gear in driven engagement with the planetary pinion gears and coupled to one of the transfer gears; and wherein
the means for coupling comprise a spider connected to the respective planetary pinion gears and rotatable coaxial with the planetary ring gear, the respective spiders being in driving engagement for rotation only in mutually opposite sense.

12. A balanced steerable power transmission comprising:
a first housing;
a rotatable drive member within the first housing;
a second housing around a portion of the first housing;
means for pivoting one of the housings relative to the other housing about a pivot axis extending along one of the housings;
a drive shaft fixed in location on one of the housings and rotatable relative thereto;
a pair of similar drive trains between the drive member and the drive shaft, each drive train having:
a first portion coupled to the drive member and fixed in location relative to the first housing,
a second portion in equal driving engagement with the drive shaft irrespective of the pivotal location of the drive shaft around the pivot axis, including a ring gear between the first housing and the second housing, and means for mounting each respective ring gear for rotation about the pivot axis of the second housing, said ring gears of the respective drive trains being coupled to the drive member for rotation in mutually opposite sense, and
coupling means between the drive member and the drive shaft for advancement of rotation of the second portion of the drive train relative to rotation of the respective first portion.

13. A balanced steerable power transmission as defined in claim 12 wherein the first housing is fixed in position and the means for pivoting comprises means for pivoting the second housing relative to the first housing.

14. A balanced steerable power transmission as defined in claim 13 further comprising means for applying driving rotation to the drive member for rotating the drive shaft.

15. A boat comprising:
a hull;
a motor mounted in the hull;
a steerable power transmission connected to the motor and including a pivotable portion extending below the hull;
a drive propeller on the pivotable portion of the transmission;
a rotatable input member connected to the motor;
a rotatable output member connected to the propeller, said output member being pivotable with the pivotable portion of the transmission;
a balanced drive train between the input member and the output member comprising:
a first ring gear;
a second ring gear coaxial with the first ring gear;

means for mounting the first ring gear and second ring gear respectively for rotation relative to the hull and the pivotable porton of the transmission;

first gear means for interconnecting the input member and the ring gears in driving engagement;

second gear means for interconnecting the output member and the ring gears in driving engagement;

first gear means for interconnecting the input member and the first ring gear in driving engagement;

second gear means for interconnecting the input member and the second ring gear in driving engagement, said first and second gear means being similar for driving the first and second second rings gears in mutually opposite directions of rotation;

third gear means for interconnecting the output member and the first ring gear in driving engagement;

fourth gear means for interconnecting the output member and the second ring gear in driving engagement, said third and fourth gear means being similar for driving the output member in response to mutually opposite directions of rotation of the first and second ring gears; and one pair of said similar gear means including a pair of similar coupling means in each gear means of the pair, respectively, for advancement of rotation of one gear means of the pair relative to the other gear means of the pair.

* * * * *

UNITED STATES PATENT OFFICE
CERTIFICATE OF CORRECTION

Patent No. __3,851,614__    Dated __December 3, 1974__

Inventor(s) __Donald F. Nelson__

It is certified that error appears in the above-identified patent and that said Letters Patent are hereby corrected as shown below:

Abstract, line 19, "sensed" should be --senses--.

Column 1, line 48, "relative" should be --relatively--.

Column 5, line 32, "normal" should be --nominal--.

Column 7, line 14, "drive" should be --driven--.

Column 8, line 32, after "other" insert --spider--.

Column 12, line 10, "rings" should be --ring--.

Signed and sealed this 11th day of February 1975.

(SEAL)
Attest:

RUTH C. MASON
Attesting Officer

C. MARSHALL DANN
Commissioner of Patents
and Trademarks